(12) United States Patent
Livshitz et al.

(10) Patent No.: US 6,741,151 B1
(45) Date of Patent: May 25, 2004

(54) MOVING COIL LINEAR ACTUATOR

(75) Inventors: Leonid M. Livshitz, Nesher (IL); Yuval Vaknin, Nesher (IL)

(73) Assignee: Levram Medical Systems, Ltd., Nesher (IL)

( * ) Notice: Subject to any disclaimer, the term of this patent is extended or adjusted under 35 U.S.C. 154(b) by 73 days.

(21) Appl. No.: 10/305,789

(22) Filed: Nov. 27, 2002

(51) Int. Cl.$^7$ ................................................ H01F 7/08
(52) U.S. Cl. ...................... 335/222; 335/296; 335/301; 335/306
(58) Field of Search .................. 335/296–306, 335/222–224, 148–150; 381/412, 420, 421, 422

(56) References Cited

U.S. PATENT DOCUMENTS 3,768,054 A * 10/1973 Neugebauer ............... 335/304
4,048,713 A * 9/1977 Hvass ........................ 29/594
4,808,955 A 2/1989 Godkin
5,345,206 A * 9/1994 Morcos ...................... 335/222

OTHER PUBLICATIONS

"The Straight Attraction" one part ( 5 pgs.& part two (5 pgs.), Tony Marcos, Motion Control, Jun. 2000.

"Approaches to Permanent Magnet Circuit Design", Herbert A. Leupold, IEEE Transactions on Magnetics, vol.29, 6pgs., Nov. 1993.

* cited by examiner

*Primary Examiner*—Ramon M. Barrera
(74) *Attorney, Agent, or Firm*—Herbert Dubno

(57) ABSTRACT

A moving coil linear actuator has a bobbin or coil wound as close packed turns of rectangular—cross section wire and radially polarized circumferentially continuous ring magnets which are provided with flux focusing cladding. The result is a light-weight high power linear actuator.

5 Claims, 11 Drawing Sheets

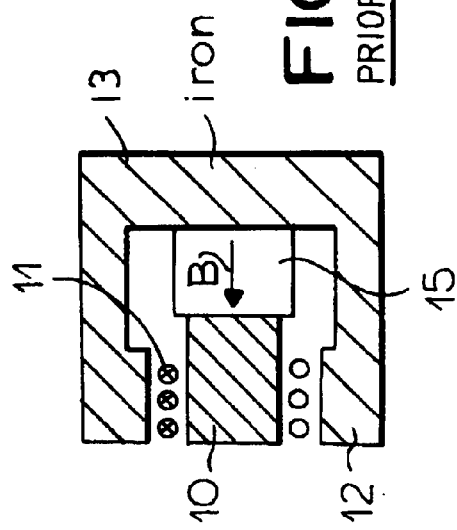
FIG.1A *PRIOR ART*
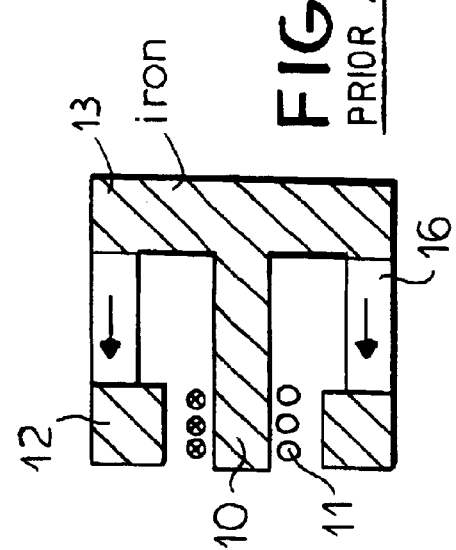
FIG.1C *PRIOR ART*
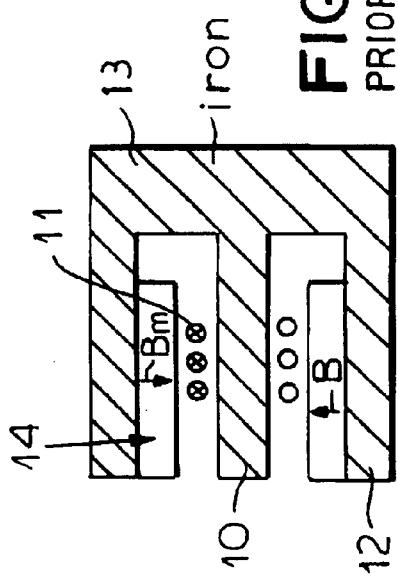
FIG.1B *PRIOR ART*
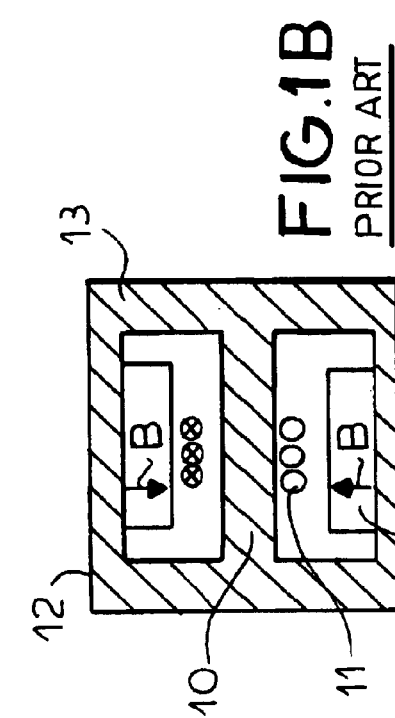
FIG.1D *PRIOR ART*

MOVING COIL LINEAR ACTUATOR

FIELD OF THE INVENTION

Our present invention relates to a moving coil linear actuator and, more particularly, to a linear actuator of the type which utilizes an electromagnetic force generated by the interaction of a coil with a field of a permanent magnet.

BACKGROUND OF THE INVENTION

Moving coil actuators, also termed "voice coil actuators", can be utilized to provide direct drive in control systems as servomotors with linear characteristics and for the most part are traditional servo devices since the force which is produced by the interaction of the coil and the field of the permanent magnet is proportional to the current applied to the coil. Such devices can also be referred to as two-terminal devices since the current is applied to the two conductors of a coil and the direction of movement of the coil is a function of the direction of current flow through the latter. Such devices can be used in applications requiring high acceleration, high frequency actuation and a flat force versus displacement characteristic.

The moving coil linear actuator is a direct-drive linear motor and utilizes the principles described in "The Straight Attraction", Part One, Tony Morcos, Motion Control June 2000, pages 29–33, "The Straight Attraction", Part Two, Tony Morcos, July/August 2000, Motion Control, pages 24–28, U.S. Pat. No. 5,345,206, U.S. Pat. No. 4,808,955.

In all of these systems, the moving coil linear actuator may suffer from a wasting of air gap space because of a low packing factor of the conductive material of the coil, a greater weight of the unit than may be necessary, problems with flux leakage at an open end of the coil and flux irregularity which may result because of segmentation of the magnets as will be described in greater detail hereinafter.

OBJECTS OF THE INVENTION

It is the principal object of the present invention to provide a moving coil linear actuator which is free from at least some of the drawbacks of earlier actuators and has the advantage thereover of being of reduced weight and greater magnetic flux efficiency.

Another object of the invention is to provide an improved moving coil actuator in which there is better utilization of the air gap within the actuator than has been the case heretofore.

Another object of this invention is to provide a moving coil linear actuator which has all of the advantages of prior art actuators but is of reduced weight and improved response in terms of the utilization of the magnetic field.

SUMMARY OF THE INVENTION

These objects and others which will become apparent hereinafter are attained, in accordance with the invention by providing a flux cladding at the open end of the coil which reduces flux leakage and, in addition, by increasing the conductor density of the coil.

More particularly, the moving coil actuator of the invention can comprise:

a ferromagnetic core;

a coil axially movable on the core and surrounding the core, the coil being comprised of a multiplicity of closely packed turns of a rectangular cross section conductor;

at least one radially polarized circumferentially continuous ring magnet surrounding the coil and magnetically interacting with the coil upon electrical energization thereof to produce a force axially displacing the coil;

a ferromagnetic sleeve open at one axial end, receiving the ring magnet, and connected to the core at an opposite axial end; and a flux-confining cladding on the magnet and extending over an end of the magnet at the one axial end.

According to the invention, therefore, the coil provides a conductor of rectangular cross section, which, when wound in a close packed relationship of the turns, can have a packing factor (ratio of conductive material to total coil volume) which is at least 80% and can be as great as 85% or more (preferably at least 90%). Of course, the usual conductor is copper.

It has been found to be advantageous to provide a plurality of the radially polarized circumferentially continuous ring magnets in axially-spaced relationship in the sleeve or even axially contiguous with one another. The circumferential continuity of the ring magnets ensures that flux leakage, as can occur with segmented magnets, is eliminated. The cladding itself for the coil can be magnetic and poled transversely to the polarization of the ring magnet.

It has been found to be advantageous, moreover, to make the core and sleeve assembly of a high permeability ferromagnetic material such as vanadium permadur.

The moving coil linear actuator of the invention thus has the advantage that there is a uniform magnetic field in the air gaps because of the whole ring radial magnetization and flux cladding at the open end. The shape of the core assembly, generated by computer as described below, results in a substantial reduction of weight and hence a reduced need for expensive high-permeability ferromagnetic material such as the vanadium permendur.

The packing factor is also high, as noted, being 85% or better.

The flux focusing which results from the cladding allows radially magnetized magnets which are embedded in the interior of the ferromagnetic sleeve or cylinder, to have an optimum thickness which, in accordance with the graphs provided below, will produce maximum force per unit of ohmic power dissipated in the coil and optimal magnet volume. The magnetic field intensity as a result of flux focussing increases away from the magnets and for a fixed power dissipation, the current density decreases with the winding thickness.

The inner core of the ferromagnetic material is joined at the closed end to the permanent magnet assembly of the sleeve.

BRIEF DESCRIPTION OF THE DRAWING

The above and other objects, features, and advantages will become more readily apparent from the following description, reference being made to the accompanying drawing in which:

FIG. 1A is a cross sectional view showing one prior art moving coil linear actuator;

FIG. 1B is an axial section through a second prior art moving coil linear actuator;

FIG. 1C is an axial section through a third moving coil actuator of the prior art;

FIG. 1D is an axial section through still a fourth embodiment of a conventional moving coil linear actuator;

SPECIFIC DESCRIPTION

Figure 2:
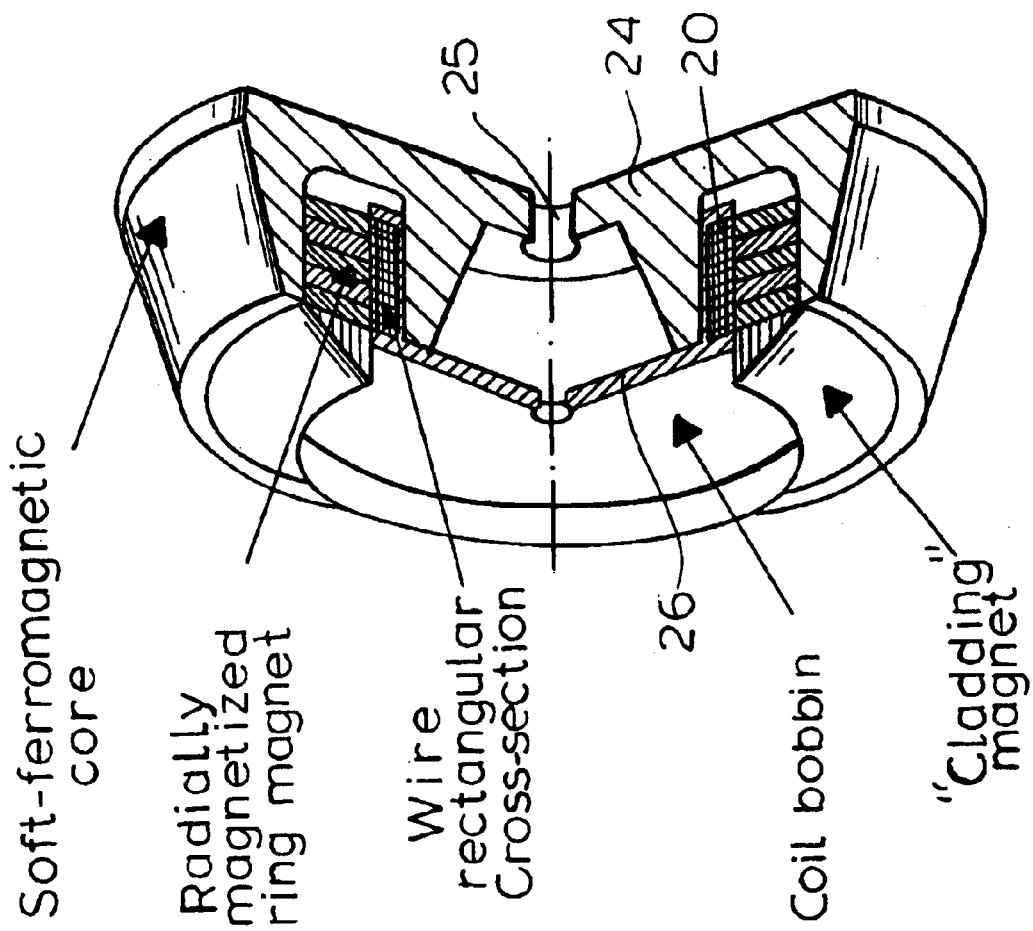
FIG. 2 is a partly sectioned perspective view of a moving coil actuator according to the invention.

FIGS. 1A–1D show various prior art moving coil linear actuators. In each of these cases, there is a soft iron core 10 which receives the coil 11 of round wire so that the coil can move and is coupled to a member which may be actuated by that coil. The soft ferromagnetic sleeve 12 which surrounds the coil is joined to the core at the back 13 of the device to form a magnetic circuit. The actuator includes a magnet such as the magnet 14, made up of a plurality of angularly-spaced radially magnetized segments as in FIGS. 1A and 1B, or axially magnetized magnet 15 of FIG. 1C and axially magnetized segments 16 of FIG. 1D. All of these two-terminal noncommutated devices can be used in linear applications requiring high acceleration, high frequency actuation and flat force versus displacement characteristics.

They have, however, in common the following drawbacks:

1. Nonuniform air gap flux density distribution due to flux leakage at an open end of the coil and performance degradation depending upon the number of magnet segments and their spacing.

2. They require large amounts of soft magnetic material which contributes to the high weight of the motor.

3. There is a waste of air gap space because of the space around the circular cross section wires of the coil.

The linear actuator of the invention, by contrast, comprises a coil 20, wound on a bobbin 21 from square section wire (see FIGS. 3A), and thus with a greater density of copper in the cross section of the coil, the bobbin being slidable on the core 22 of soft ferromagnetic material which has a sleeve 23 connected to that core 22 by a back 24 of the actuator. A hole 25 in the back prevents an air plug from forming in the linear actuator.

The bobbin 21 can also be formed with a plate 26, likewise provided with a hole 27 and serving to impart motion to a load. Members 26 and 21 may be formed in one piece from metal but to minimize eddy currents may be formed of a synthetic resin material as shown for the bobbin 21' in FIG. 3A, if desired.

Figure 3:
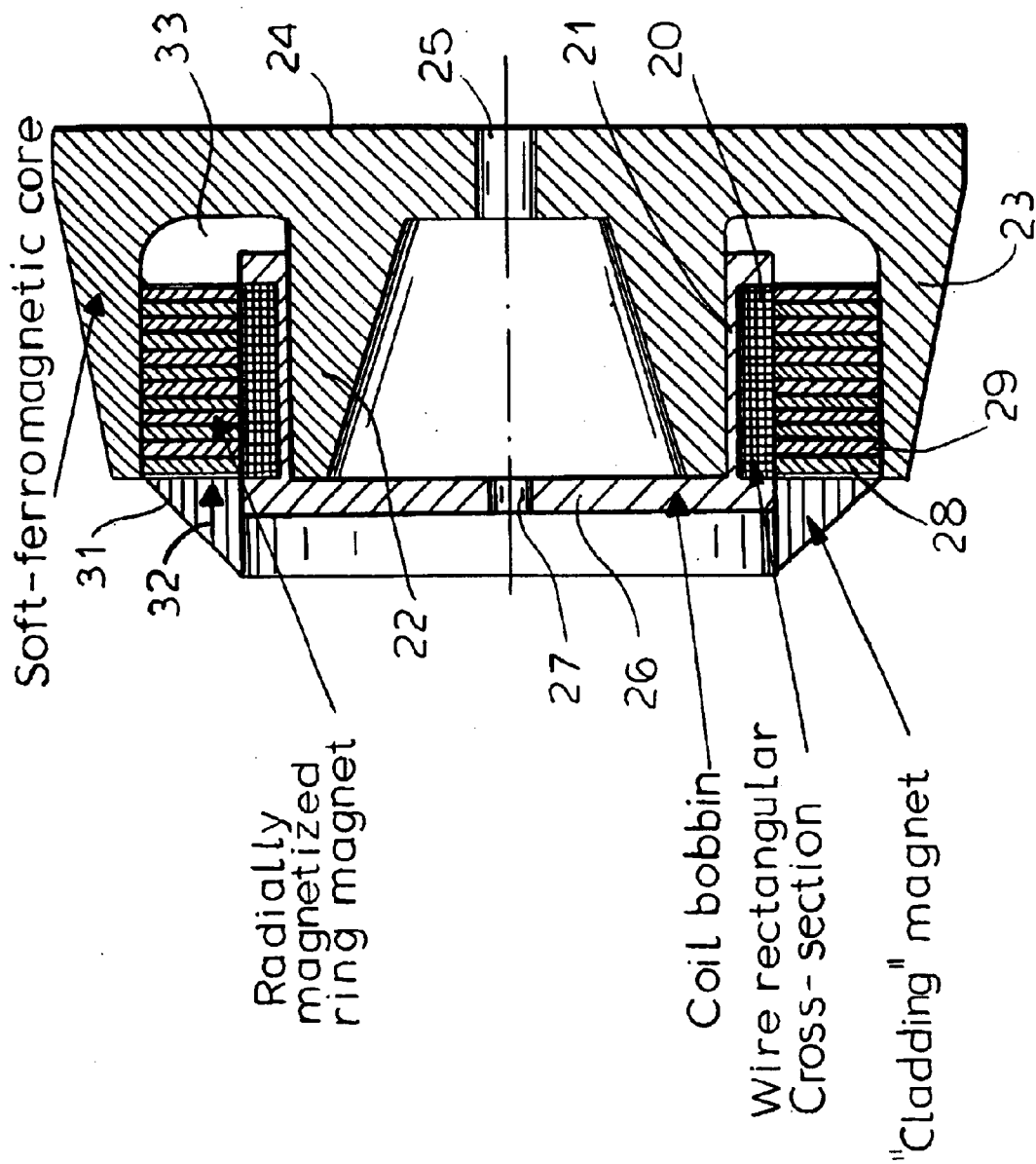
FIG. 3 is an axial cross section through this moving coil actuator.
Figure 3B:
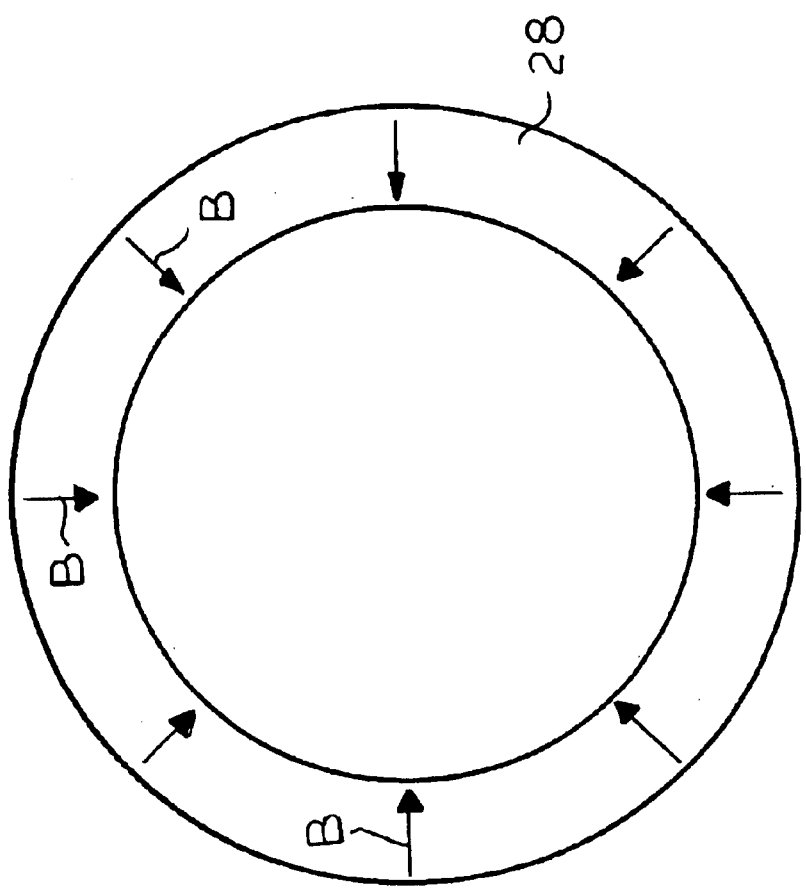
FIG. 3B is an axial view of one of the magnet rings for the system of FIGS. 2 and 3 showing the radial magnetization thereof.

As can be seen from FIGS. 2 and 3, moreover, the coil 20 cooperates with fixed radially polarized ring magnets 28, 29, 30 . . . stacked axially adjacent one another and one of which has been shown at 28 in FIG. 3B where the radial polarization has been indicated by the arrows B. The thicknesses of these magnets can be determined from, for example, an optimizing curve as in FIG. 5B, for example. Of course a single radially magnetized ring magnet may be used as well.

Figure 7:
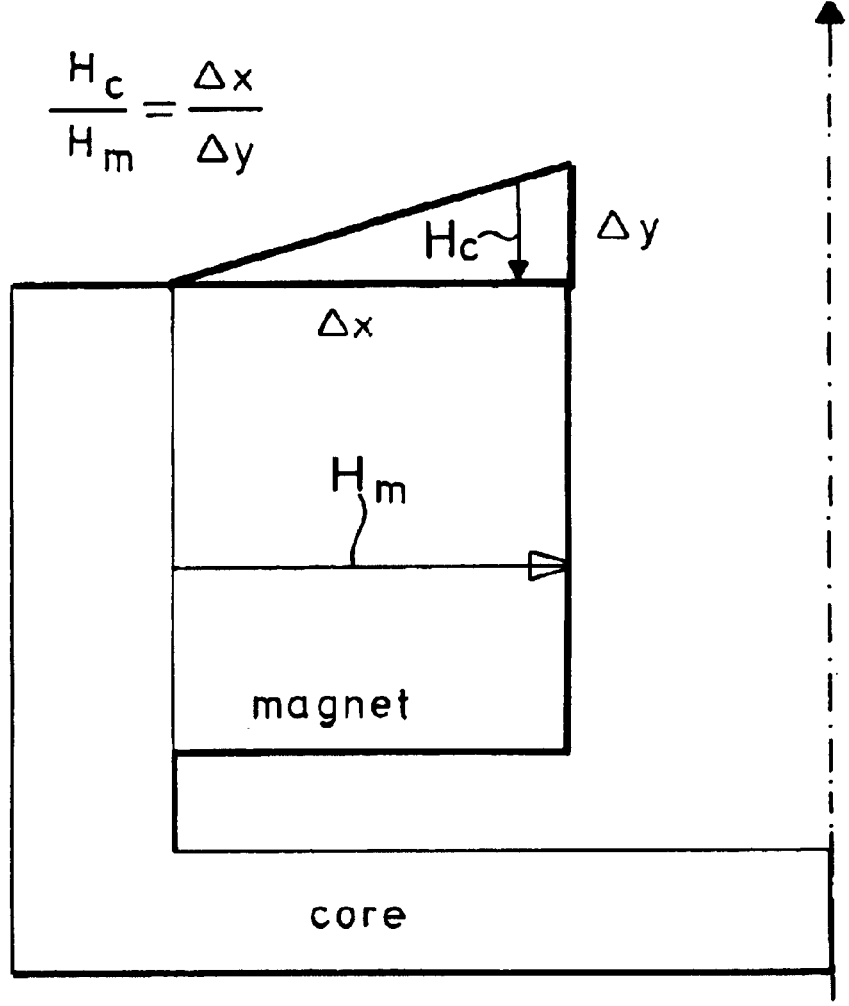
FIG. 7 is a diagram illustrating flux leakage at an air gap contained by transversely magnetized cladding, $H_c$ and $H_m$ representing the coercivity of the cladding magnet and the main magnet, respectively.
Figure 8:
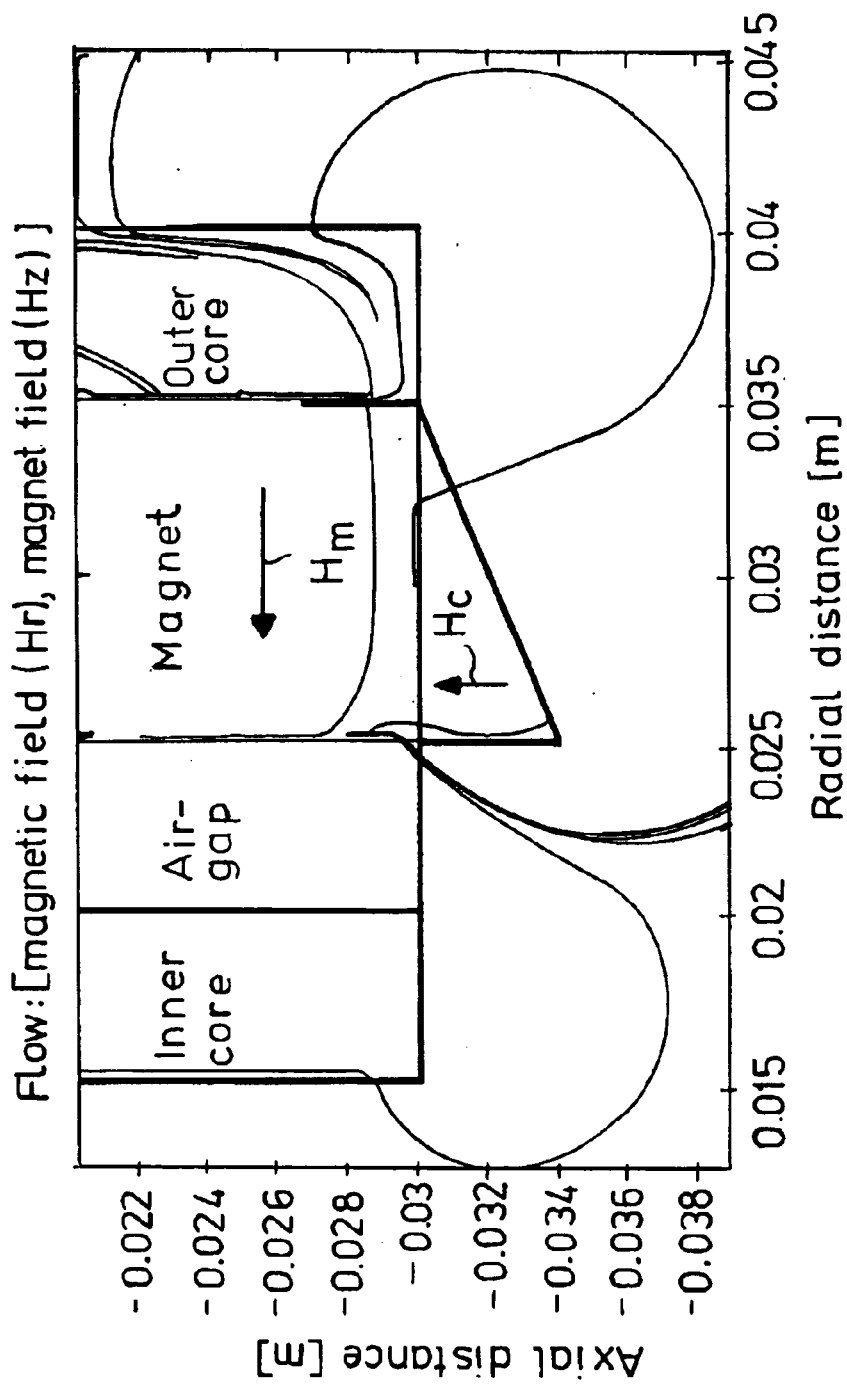
FIG. 8 is a graph showing magnetic field flow confinement by a cladding magnet (FEMlab 2.2 simulation), showing magnetic flux redirected inward.
Figure 9:
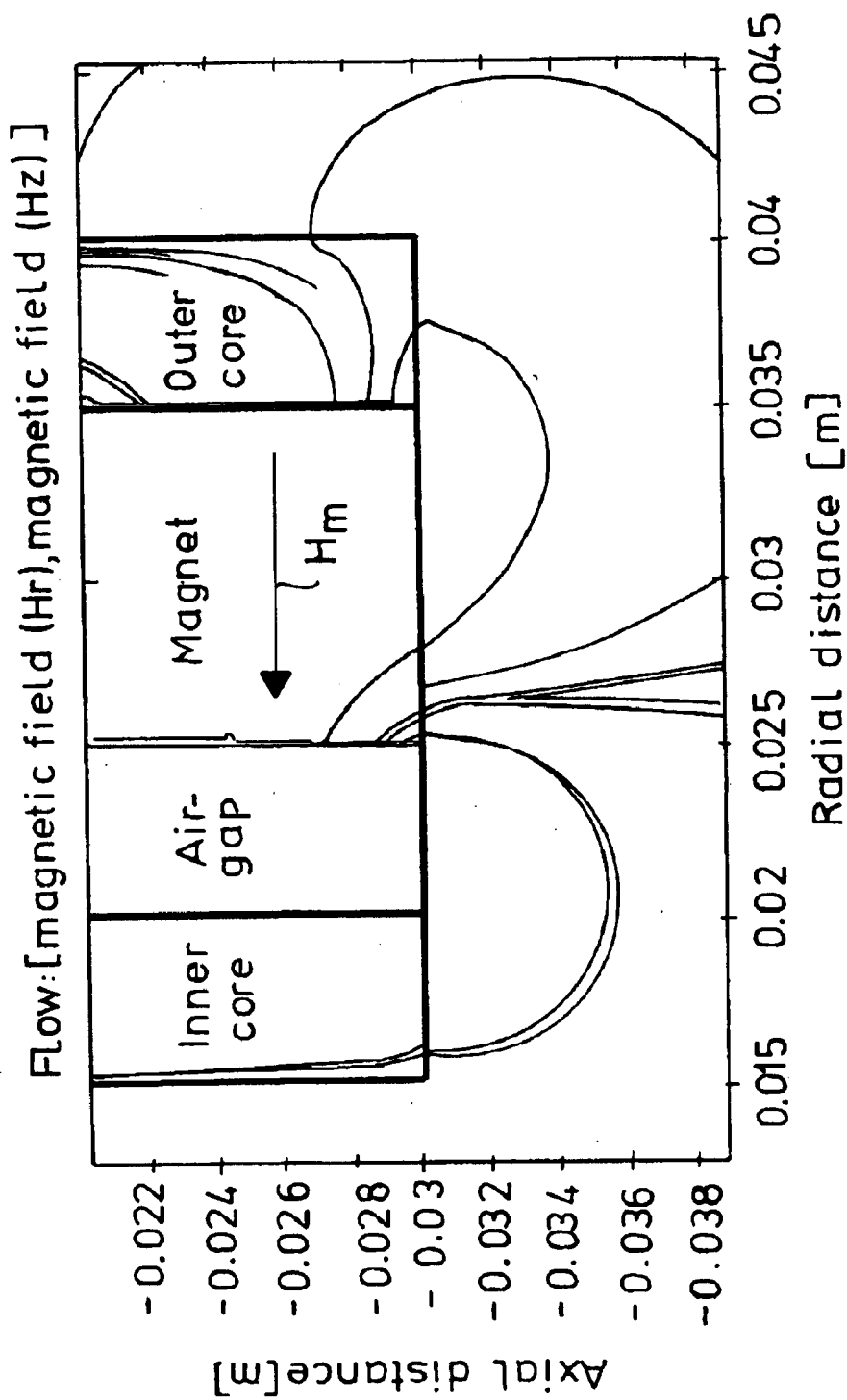
FIG. 9 is a graph showing magnetic field flow (FEMlab 2.2 simulation) without the cladding magnet so that the magnetic flux leakage through the magnet face is evident.

The open face of the assembly of the radially polarized magnets is closed by a cladding magnet 31 which is polarized transversely to the main magnets 28–30, etc., i.e. in an axial direction as represented by the arrow 32 in FIG. 3. The effect of the cladding magnet has been demonstrated in FIGS. 7–9.

While the specific configuration of the ferromagnetic core 22–24 is not critical, it has been found to be advantageous and thus, while the inner surface of the sleeve 23 and the outer surface of the inner member 22 are both cylindrical, the outer surface of member 23 and the inner wall of member 22 can converge toward the open side of the chamber 33 in which the bobbin and the ring magnets are received.

Figure 3A:
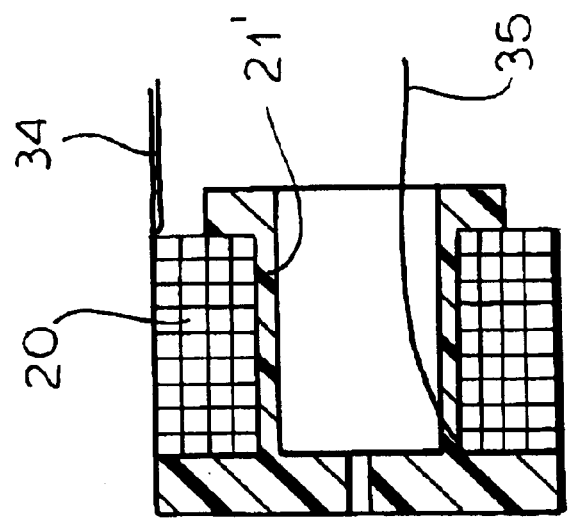
FIG. 3A is an axial section through the coil and its bobbin in the case of a bobbin composed of synthetic resin to reduce eddy currents.

The two terminals or conductors of the coil have been shown at 34 and 35 in FIG. 3A and when the coil is energized, depending upon the polarity of the energizing source, the coil bobbin will move axially to operate a load as has been described. The advantage of this design includes:

1. A uniform magnetic field in the air gap as a result of the radial magnetization of the main magnets coupled with the magnetic cladding of the open end (compare FIGS. 8 and).

2. The assembly permits computer generation of the shape of the core to ensure a uniform magnetic flux density distribution, reduced weight and saving in the cost of highly permeable ferromagnetic material.

3. A high packing factor or ratio of copper to total air gap volume of say at least 90%.

FIGS. 5A, 5B, 6A and 6B show that the linear actuator of the invention can permit optimization in terms of the coil weight and magnet thickness. Because of the flux focussing, radially magnetized magnets have an optimum thickness. Using the graphs of FIGS. 5A, 5B, 6A and 6B it is possible to find the optimal thickness of the coil windings to produce a maximum force per unit of ohmic power dissipated in the armature winding and an optimal magnetic ring thickness for a given magnetic material volume.

Since the windings are in the air gap, increasing the thickness of the windings increases the effective air gap and hence decreases the magnitude of the air gap flux density. Due to the effect of flux focusing the magnetic field intensity increases away from the magnet. For fixed power dissipation in the windings, the current density decreases with the thickness of the windings.

Figure 4A:
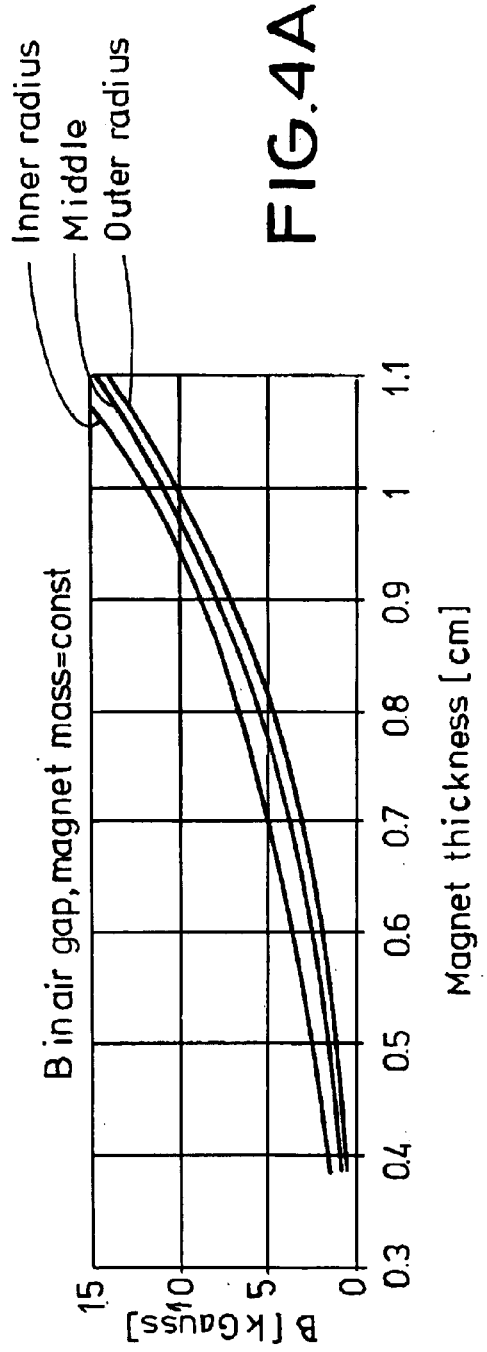
FIG. 4A is a graph of the magnetic induction in the air gap versus the magnetic thickness for inner, middle and outer portions of the air gap.
Figure 4B:
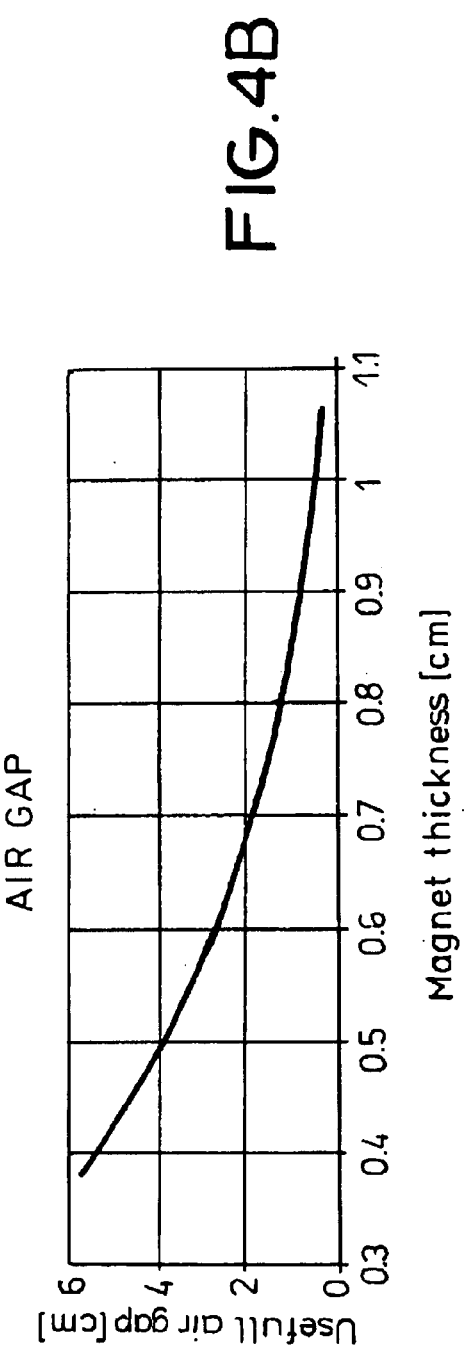
FIG. 4B is a graph of the air gap versus the magnet thickness.

As noted, FIG. 4A shows the magnetic induction B in the air gap for a magnetic mass which is held constant at various radii of the air gap. FIG. 4B shows the air gap as a function of the thickness of the ring magnet.

Figure 5A:
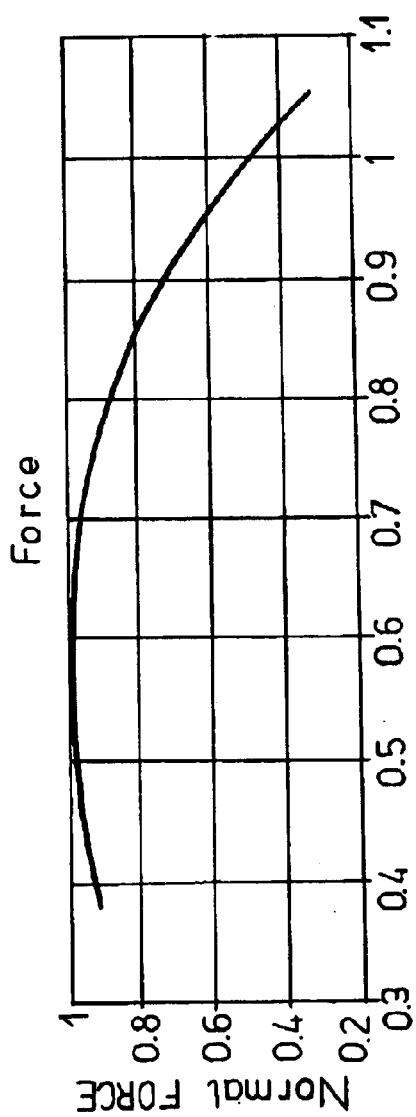
FIG. 5A is a graph of force variation with magnet thickness of a magnet ring or corresponding air gap thickness.
Figure 5B:
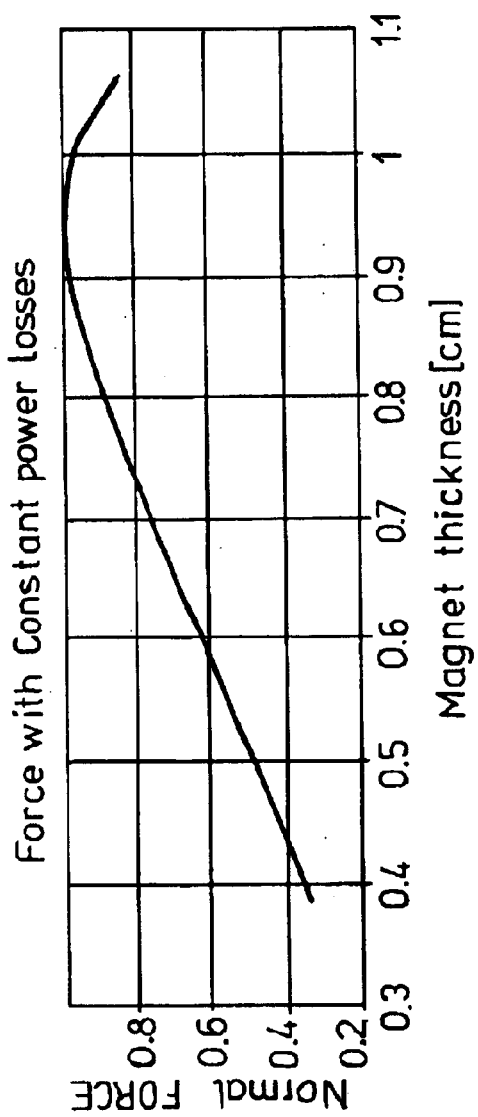
FIG. 5B is a graph of the variation of the force with the thickness of the magnet ring under the constraint of constant ohmic power dissipation, an optimum point being at a magnet thickness of substantially 0.95 cm.
Figure 6A:
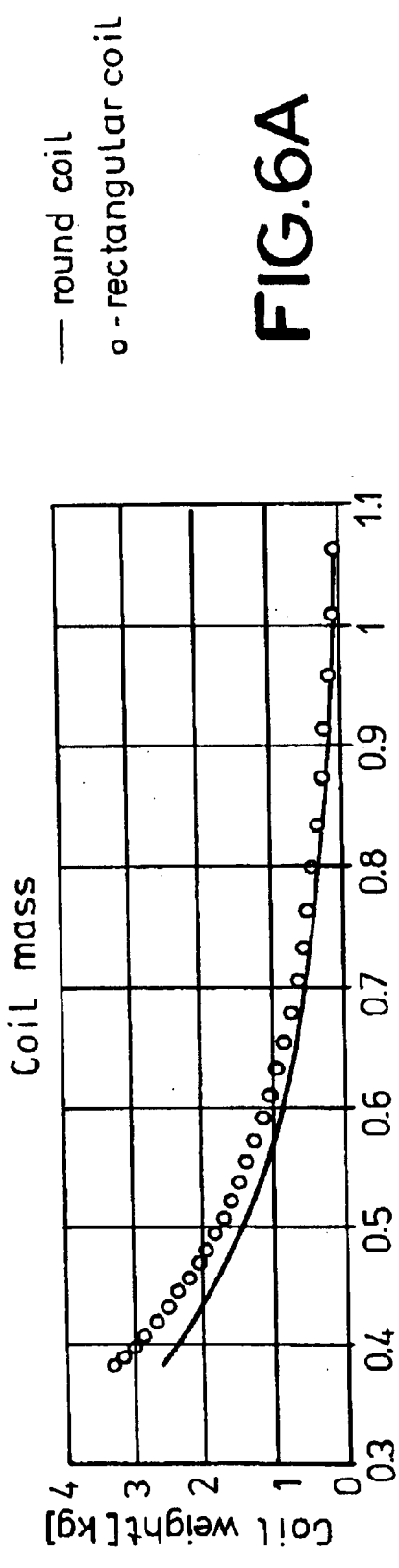
FIG. 6A is a graph of coil weight as a function of magnet thickness.
Figure 6B:
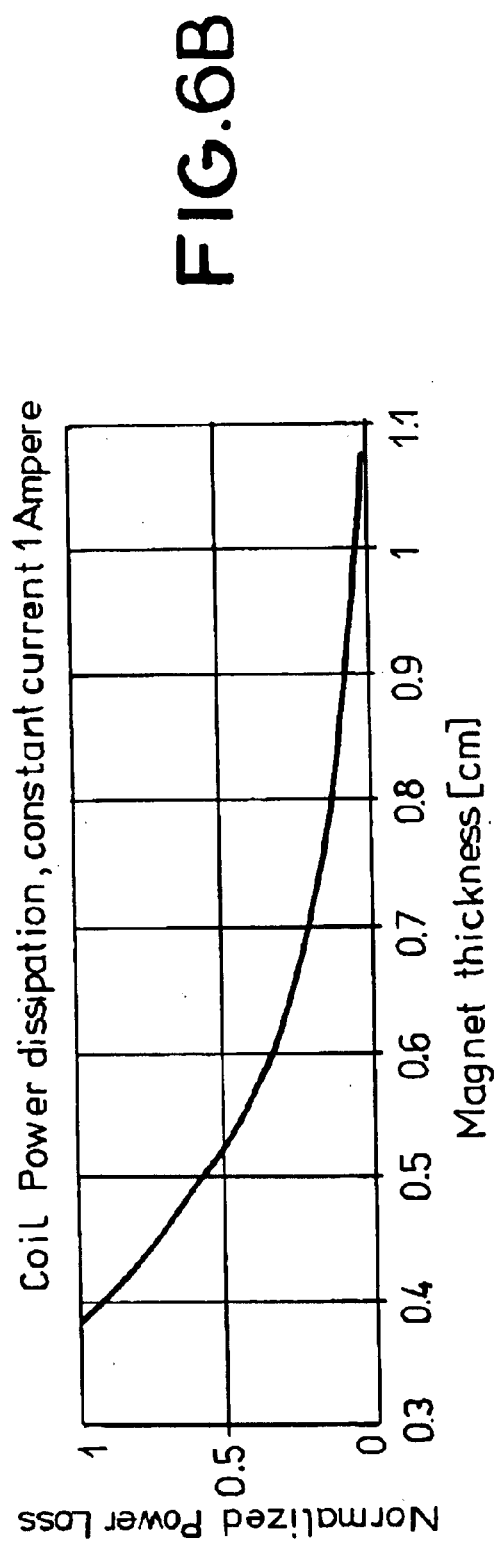
FIG. 6B is a graph of coil power dissipation under a constant current condition.

FIG. 5A shows the variation of the force with the thickness of the magnetic ring or the corresponding air gap thickness while FIG. 5B portrays variation of the force with the thickness of the magnet ring under the constraint of a constant ohmic power dissipation. FIG. 6A represents the coil weight as a function of magnet thickness while FIG. 6B shows the coil power dissipation at constant current. It may be noted, referring again to FIGS. 7–9 that one of the disadvantages of flux leakage (FIG. 9) is that sensitive components located outside the actuator may be detrimentally effected by such leakage.

Figure 10:
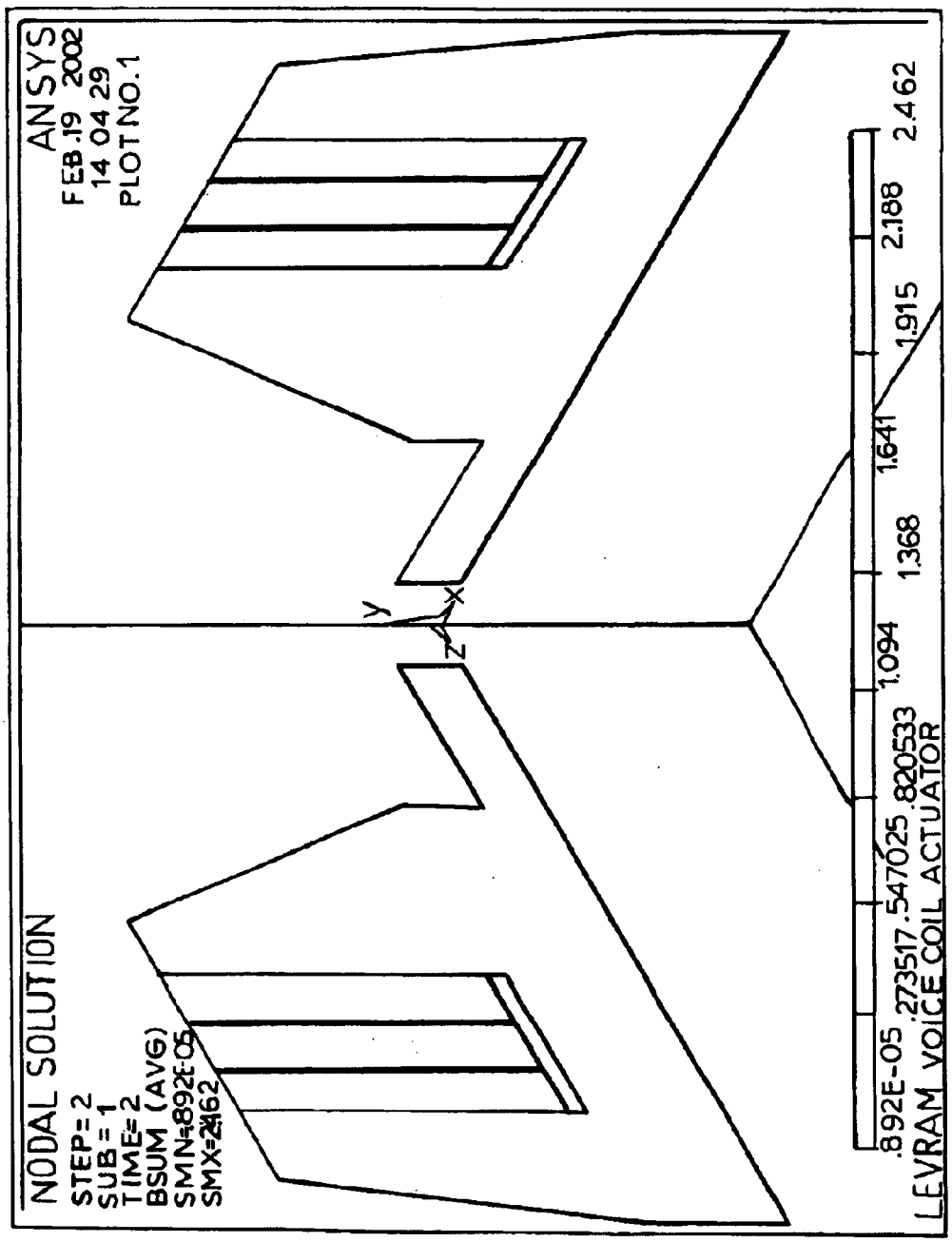
FIG. 10 is a FEM simulation of an optimally designed soft magnetic core in the case where two radially magnetized magnetic rings are present.

Whole ring magnet production has some constraints imposed on the ratio between inner and outer ring diameters (Di/Do~0.75–0.95). In this case, two thinner rings can be used as depicted in FIG. 10. Magnet is rare-earth Neodimium Boron Ferrum whole ring magnet, with radial magnetization such as anisotropic magnet NeoMag 42-16, from Magnequench, or HS-38 AR Hitachi.

The core carries very little flux near the front and has little reluctance. The flux-density and the reluctance per unit length build up is deeper in toward the back of the actuator Using FEM software we developed an optimally design core, i.e., flux density distribution is uniform providing significantly reduced overall actuator weight mass. The core has such form that the steel mass increases linearly with distance inward (see FIG. 2). Vanadium Permedur or 400 stainless steel can be used for the core.

Polymer plastics with high thermal conductivity can be used for bobbin construction. Such plastics are supplied by Quadrant or can be thermoplastics from TBA Electro Conductive Products, as alternatives to aluminum, and will greatly reduce or completely eliminate eddy currents.

Rectangular cross section wire (available in Mitsubishi Cable Industries, LTD Mexel wire) with a ratio of width to thickness of about 1.5 to 2.5 given packing ratios of more than 90%. Copper (or aluminum, to reduce weight) wire with rectangular cross section give high "packing factors" (the ratio of copper to total coil volume).

We claim:

1. A moving coil linear actuator comprising:

a ferromagnetic core surrounding an axis and extending along said axis;

a ferromagnetic sleeve spaced from and coaxial with said core and defining a cylindrical annular space therewith extending along said axis, said sleeve and said core being magnetically connected at one axial end of said space, said space being open at an opposite axial end;

a coil holder axially shiftable in said space and surrounding said core;

a coil on said coil holder and axially shiftable there-with in said space, said coil being comprised of a multiplicity of closely packed turns of a conductor of a rectangular cross section;

a stack formed by a multiplicity of radially polarized circumferentially continuous ring magnets axially adjacent one another in said space and magnetically interacting with said coil upon electrical energization thereof to produce a force axially displacing said coil relative to said core and said sleeve; and a flux-confining cladding magnet polarized in the direction of the axis and in the form of a triangular cross section ring bounding said stack at the open end of said space.

2. The moving coil actuator defined in claim 1 wherein said ferromagnetic sleeve and said ferromagnetic core are composed of vanadium permendur.

3. The moving coil actuator defined in claim 2 wherein said coil has a packing factor ratio of volume of said conductor to total volume of said coil of at least 80%.

4. The moving coil actuator defined in claim 3 wherein said conductor is copper.

5. The moving coil actuator defined in claim 4 wherein said packing factor ratio is about 85%.

* * * * *